United States Patent [19]

Mitchell

[11] 3,898,347

[45] Aug. 5, 1975

[54] FIXED VOLATILE FLAVORS AND METHOD

[75] Inventor: William A. Mitchell, Lincoln Park, N.J.

[73] Assignee: General Foods Corporation, White Plains, N.Y.

[22] Filed: Oct. 9, 1973

[21] Appl. No.: 404,528

Related U.S. Application Data

[63] Continuation-in-part of Ser. No. 376,088, July 2, 1973, abandoned.

[52] U.S. Cl. ............................ 426/534; 426/658
[51] Int. Cl. ................................. H23l 1/26
[58] Field of Search .............. 426/380, 175, 221

[56] References Cited
UNITED STATES PATENTS 3,767,430   10/1973   Earle et al. .................. 426/380
3,787,592   1/1974   Mitchell ........................ 426/380

Primary Examiner—A. Louis Monacell
Assistant Examiner—J. M. Hunter
Attorney, Agent, or Firm—Thaddius J. Carvis; Daniel J. Donovan; Bruno P. Struzzi

[57] ABSTRACT

Volatile flavoring compounds such as acetaldehyde are fixed in crystalline sucrose in low amounts. The sucrose is crystallized from a supercooled, glassy, aqueous solution containing the volatile flavoring compound and from 88% to 93% sucrose based on the combined weight of sucrose and water. Crystallization proceeds to form a stiff mass of crystalline sucrose which is then crumbled and dried.

15 Claims, No Drawings

3,898,347

FIXED VOLATILE FLAVORS AND METHOD

BACKGROUND OF THE INVENTION

This application is a continuation in part of copending U.S. Ser. No. 376,088, filed July 2, 1973, now abandoned.

The invention relates to food flavoring compositions. More particularly, the invention relates to an improved method for fixing volatile flavoring compounds such as acetaldehyde. Still more particularly, the present invention provides an improved manner of performing the method of commonly-assigned U.S. application Ser. No. 36,666, filed May 12, 1970, now U.S. Pat. No. 3,787,592.

It has been known for some time that compounds such as acetaldehyde are important flavor components of natural fruits and vegetables and serve as flavor enhancers for various flavor notes naturally present in meats, fruits and vegetables. Particularly, it has been found that acetaldehyde is very important in increasing the impact and freshness of certain flavors, such as fruit-type flavors. However, while the presence of acetaldehyde would be a valuable enhancer to a flavoring composition for use with a food formulation employing fruity-type flavors, it has been difficult to incorporate acetaldehyde into a stable, solid flavor composition.

Most attempts to fix acetaldehyde in various fixatives have tended to yield unstable compositions in the presence of small amounts of water or water vapor. This instability problem was apparent when powdered dessert and beverage products containing the fixed acetaldehyde were processed or packaged in a manner allowing atmospheric or product moisture to reach the fixed acetaldehyde during storage of the product. This problem can be particularly acute when a fruit-type dessert or beverage formulation using a fixed acetaldehyde flavor is packaged in dry form in a non-hermetically sealed paper envelope or container which is sufficiently pervious to allow atmospheric moisture to enter and react with or dissolve the acetaldehyde.

Acetaldehyde is chemically very reactive, is very soluble in water, and has a low boiling point (21°C). It exists as a gas at normal room temperature and pressure. It, furthermore, is readily oxidized to form acetic acid, and is easily polymerized to form paraldehyde and other acetaldehyde polymer impurities. Thus, the problem confronting the food industry in augmenting the flavor and aroma of dry powdered mixes has been that of "fixing" acetaldehyde in a sufficiently stable state to avoid volatization and/or chemical reaction during storage. Additionally, it must be so held that it readily releases the acetaldehyde compound during the normal household preparation of rehydrating or otherwise preparing a finished table product from the powdered mix (e.g. by addition of either hot or cold water.)

The above-identified Ser. No. 36,666 which is hereby incorporated by reference, sets forth a process in which sucrose is crystallized in the presence of volatile flavoring compounds such as acetaldehyde in order to entrap low levels of acetaldehyde within the crystal structure of the sucrose. The present invention provides a new and improved manner for carrying out that process.

A process specifically described in that application leaves large amounts of mother liquor after crystallization. According to that process, the crystals are separated from the mother liquor (e.g., centrifugation or filtration) and dried. It has been determined that, unless the water content of the crystallization slurry is reduced, such as by a centrifugation or filtration operation, elevated temperatures should be avoided during drying, but some of the sucrose crystals redissolve and release acetaldehyde. And, air drying the entire crystallization slurry, wherein both crystal separation and elevated temperatures are avoided, would require impractically long periods of time.

A feature of the above-noted process of the above-identified application was that acetaldehyde containing relatively high levels of paraldehyde impurities could be employed to provide a product having a clean acetaldehyde taste. The crystallization was found to fix acetaldehyde and reject paraldehyde. However, employing impure acetaldehyde would be counter indicated when operating at elevated solids contents and drying in the presence of the mother liquor, because the paraldehyde and other polymeric acetaldehyde impurities would be retained with the product at undesirable levels.

SUMMARY OF THE INVENTION

Accordingly, it is an object of the present invention to provide an improved process to fix volatile flavoring compounds such as acetaldehyde into crystalline sucrose.

It is a more specific object of the present invention to simplify the recovery of dry, crystalline, sucrose-fixed acetaldehyde following crystallization.

It is yet another object of the present invention to provide a process for forming sucrose-fixed acetaldehyde having a clean acetaldehyde taste which permits the use of acetaldehyde containing substantial amounts of paraldehyde impurity and still crystallize from solutions having relatively high sucrose contents and not removing the mother liquor prior to drying.

These and other objects are accomplished by the present invention which provides a method for producing a solid flavoring composition containing low levels of volatile flavoring compounds comprising the steps of: forming a supersaturated, glassy, aqueous, sucrose solution comprising from 88% to 93% sucrose based on the combined weight of sucrose and water, and a volatile flavoring compound; crystallizing sucrose from the solution to fix an amount of the volatile flavoring compound within the individual sucrose crystals at a level of less than about 0.5% by weight of the crystal; and drying the resulting, stiff, crumbly mass. According to a preferred embodiment of the invention, the drying is commenced at an initially low temperature and is continued under progressively increasing temperatures to completion at a final drying temperature of from about 60°C to 140°C. An advantage of this embodiment is that any paraldehyde or other acetaldehyde polymer impurities are removed, presumably, by depolymerization or volatilization.

DETAILED DESCRIPTION OF THE INVENTION

The present invention is based upon the discovery that it is possible to greatly improve the process efficiency for fixing volatile flavoring compounds such as acetaldehyde in crystalline sucrose by crystallizing from a supersaturated, glassy, aqueous sucrose solution having a critical, high sucrose content.

It has been determined that a sucrose content of from 88% to 93% based on the combined weight of sucrose and water is necessary to attain the objectives of the present invention. Lower sucrose contents will result in slurries too wet and fluid to be crumbled and dried efficiently without the need for some preliminary treatment to reduce the water content. And, higher sucrose concentrations are found to severely limit the quantity of acetaldehyde which can be fixed. Moreover, the oxidation of acetaldehyde to acetic acid occurs quite rapidly after processing where the sucrose content is above the stated range. The problems of poor fix level and oxidation are believed directly related to the requirement of a critical, minimum water content.

According to the invention, supersaturated, glassy, aqueous sucrose solution comprising from 88 to 93% sucrose, based on the combined weight of the sucrose and water, and a volatile flavoring compound is formed from which the sucrose is crystallized. The supersaturated, glassy, aqueous sucrose solution is desirably formed by boiling an unsaturated, aqueous sucrose solution to a temperature of from about 118°C to about 125°C to reduce the water content to 7 to 12%, and cooling the solution to achieve super-saturation, preferably to a temperature of from about 20°C to 80°C.

Those skilled in the art will be aware that the cooling operation to obtain the supersaturated, glassy sucrose solution should be conducted with caution to avoid crystallization of the sucrose before the desired temperature is achieved and the acetaldehyde has been added. Specifically, vibration should be avoided as this may tend to cause spontaneous crystallization even in the absence of seed crystals. Additionally, the solution should be protected from the settling of any foreign material therein which could act as seed to initiate crystallization.

It is important to the successful performance of the invention that the supersaturated solution be essentially glassy. It has been found in practice that solutions containing any significant amount of crystals before the crystallization step in the presence of the volatile flavoring compound do not form the desired stiff, crumbly mass. These solutions form, instead, a soupy slurry containing relatively large crystals. It is presently believed that this occurs because crystallization from a solution containing significant amounts of crystals tend to form larger crystals, and the surface area of these crystals is not sufficient to tie up all of the water present. In any event, the desired results achieved when a glassy supersaturated solution is obtained are real and reproduceable and applicant does not wish to be bound to any particular theory.

The particular temperature to which the supersaturated aqueous sucrose solution is cooled before crystallization is dependent upon the particular volatile flavoring compound to be fixed and the crystallization procedure employed. When crystallizing in an open vessel at atmospheric pressure, it is necessary that the supersaturated sucrose solution be cooled to a temperature not higher than about 20°C above the boiling point of the volatile flavoring material employed. In the case of acetaldehyde, having a boiling point of 21°C, the supersaturated sucrose solution is desirably cooled to a temperature below 20°C to 40°C. Above about 40°C there is excessive loss of acetaldehyde.

Temperatures greater than about 20°C above the atmospheric pressure boiling point of the volatile flavoring compounds can be employed where the crystallization is carried out under increased pressure or with the aid of reflux. It is noted, however, that crystallization is somewhat retarded by superatmospheric pressure. On the other hand, conducting crystallization at somewhat elevated temperatures with the aid of a reflux condenser provides desirable results. According to this embodiment, the volatile flavoring compound is rapidly volatilized, condensed and recycled to the supersaturated sucrose solution which is maintained under constant agitation while crystallizing and cooling. When employing this procedure, crystallization can be started and the acetaldehyde added at temperatures of up to about 80°C. It is noted that crystallization at temperatures somewhat higher than the boiling point of the volatile flavoring compound is desirable from the standpoint that the desired glassy supersaturated solution is more easily attainable. This is because less time is required for cooling and the degree of supersaturation is reduced. An additional advantage in the use of these higher temperatures is that the amount of paraldehyde and other acetaldehyde polymer impurities can be reduced due to depolymerization.

The volatile flavoring compound is desirably added to the supersaturated sucrose solution in the desired amount with stirring before crystallization. The volatile flavoring compound is desirably added in an amount in excess of the level to be fixed in the sucrose. For example, in the case of acetaldehyde where it is desired to fix it at a high level, it is desirably added to the supersaturated sucrose solution at a level of from about 1.0 to 3.0% based on the weight of the sucrose. Lower amounts can of course be employed, and a finite amount of acetaldehyde will be fixed within the crystals as long as there is any acetaldehyde available in the supersaturated sucrose solution.

Crystallizing sucrose from the supersaturated, glassy, aqueous sucrose solution containing the volatile flavoring compound is accomplished in conventional manner. The resulting crystals have an amount of the volatile flavoring compound fixed within the individual sucrose crystals at a level of less than about 0.5% by weight of the crystal.

Typically, crystallization is effected by seeding the supersaturated sucrose solution with a small amount of sucrose crystals; e.g., on the order of 0.1% or less based on the weight of the solution. If desired, the sucrose seed can be added simultaneously with the volatile flavoring compound. Stirring is maintained for the duration of crystallization.

Crystallization proceeds rapidly on stirring. During the initial period of crystallization, the supersaturated solution remains relatively transparent in appearance. Then, after a few minutes, the solution begins to cloud and the sucrose rapidly crystallizes out to form a stiff, crumbly mass.

The stiff, crumbly mass of sucrose crystals contains no appreciable amounts of mother liquor which need to be removed before drying. If desired, this mass is crumbled and air dried at a temperature about equal to that of the crumbly mass upon termination of crystallization for a period before drying at elevated temperatures. However, it is possible to immediately subject the crystals to slightly elevated temperatures, on the order of about 30°C to 40°C, with only minimal loss of volatile flavoring compound due to redissolution of the crystals. The redissolution, and loss of volatile flavoring compound, can be mitigated by maintaining an initially low temperature differential between the mass and a relatively high volume of rapidly-moving, low-relativehumidity air. Thus, in this manner, elevated temperatures can be employed without raising the temperature of the mass due to the constant removal of heat by the vaporization of the water. The temperature is optionally, progressively increased during drying at such a rate that the remaining mother liquor always remains supersaturated. Those skilled in the art will be aware of the appropriate temperatures, humidities and flow rates. Obviously, the temperature differential between the crumbly mass and the drying air can be raised as the degree of moisture is reduced. The final drying temperature can be within the range of from about 60°C to about 140°C. In a preferred embodiment of the present invention, acetaldehyde containing significant amounts of paraldehyde or other acetaldehyde polymers as impurities is employed as the source of the volatile flavoring compound. The acetaldehyde is of course the desired compound and the acetaldehyde polymers are undesirable. When operating at the high sucrose and low water contents of the present invention, which permits efficient drying without removing the mother liquor, an undesirably high level of paraldehyde may be retained in the product. Accordingly, an undesirable odor and flavor are imparted to the crystals. According to this embodiment of the present invention, acetaldehyde containing paraldehyde or other acetaldehyde polymer impurities can be employed as source materials, without the added cost of an initial distillation operation, where the drying step is carried out at temperatures in excess of about 60°C. Advantageously, the drying temperatures employed according to the process of the present invention remove the paraldehyde and other acetaldehyde polymer, presumably by depolymerization and volatilization.

The improved process of the present invention can be employed to tenaciously fix volatile flavoring compounds within individual crystals of sucrose at any desired level up to a maximum of about 0.5% based on the weight of the sucrose. In the case of acetaldehyde, it is generally fixed at a level of less than about 0.30%; and a fix at a level of about 0.05 to 0.2% is easily achieved using an excess of acetaldehyde during crystallization. When employed in dry beverage or dessert mixes it is usually desirable to use crystalline sucrose prepared according to the present invention which contains the volatile flavoring compound fixed therein at levels approaching 0.30%, and typically at about the 0.05 to 0.2% level. However, for other applications, such as an acetaldehyde-containing sugar for sprinkling on and enhancing the flavor of foodstuffs such as fruits (e.g. strawberries, peaches, raspberries, etc.), relatively low amounts, e.g. on the order of 0.001 to 0.05%, of acetaldehyde may be desirable.

The following examples are presented for the purpose of further explaining and illustrating the present invention and are not to be taken as limiting in any sense. Unless otherwise specified, all parts and percentages are by weight.

EXAMPLE I

One hundred ml of water is admixed with 350 grams of crystalline sucrose in a sauce pan and boiled over a hot plate until the temperature reached 120°C (approximately 90% solids). The mass is cooled to 20°C where it becomes very viscous. Then, 15 ml of acetaldehyde are added as well as some seed of crystalline sucrose. The viscous mass is stirred and allowed to crystallize. When the mass becomes solid it is broken up and air dried: first, for about one hour at room temperature; and then, at increased temperatures, first at 70°C, and ending with a temperature of 120°C, for a total of one half hour. The mass is cooled to room temperature and ground to a powder in a Waring Blendor. This procedure yields acetaldehyde fixed at about 0.1% and provides a clean tasting product.

EXAMPLE II

The procedure of Example I is repeated, but this time the sucrose solution is boiled to 118°C before cooling (approximately 88% solids). Similar results to those obtained in Example I are achieved.

EXAMPLE III

The procedure of Example I is again repeated, but this time the sucrose solution is boiled to 126°C before cooling (approximately 93% solids). Again, results similar to those obtained in Example I are achieved.

EXAMPLE IV

The procedure of Example I is again repeated, but boiling the sucrose solution to only 115°C, (approximately 86% solids). The crystallization take an excessively long period of time and forms a soupy slurry.

EXAMPLE V

The procedure of Example I is again repeated, but boiling to 140°C (approximately 95% solids). The product contains only 0.03% acetaldehyde and has a strong vinegary smell after standing for 1 day.

EXAMPLE VI

The procedure of Example I is again repeated but this time using acetaldehyde having a strong paraldehyde taste, and air drying to obtain an almost dry product. This product has a strong paraldehyde taste and odor. A portion of this product is then heated to 90°C for about 30 min. No paraldehyde odor or taste is apparent in this treated portion. And, the treated portion contains about the same amount of acetaldehyde, indicating removal of paraldehyde and retention of the normally highly-volatile acetaldehyde.

The above examples and explanation are for the purpose of teaching those skilled in the art how to practice the present invention. Upon reading the above disclosure, those skilled in the art will be aware of a number of modifications and variations. It is contemplated that these modifications and variations be included within the scope of the present invention which is defined by the following claims.

What is claimed is:

1. A method for producing a solid flavoring composition containing low levels of volatile flavoring compounds comprising the steps of:
   a. forming a supersaturated, glassy, aqueous sucrose solution comprising from 88 to 93% sucrose and a volatile flavoring compound;
   b. crystallizing sucrose from the solution to fix an amount of the volatile flavoring compound within the individual sucrose crystals at a level of from about 0.05% to less than about 0.5% by weight of the crystal, and thereby form a stiff, crumbly mass; and
   c. directly thereafter, drying the mass.

2. The method according to claim 1 wherein the supersaturated sucrose solution is crystallized at a temperature of not more than 20°C above the atmospheric boiling point of the volatile flavoring compound.

3. The method according to claim 1 wherein the supersaturated sucrose solution is crystallized at a temperature of greater than 20°C above the atmospheric boiling point of the volatile flavoring compound.

4. The method according to claim 3 wherein the volatile flavoring compound which is released to the air during crystallization is condensed and recycled to the supersaturated sucrose solution.

5. The method according to claim 1 wherein the volatile flavoring compound is acetaldehyde.

6. The method according to claim 5 wherein the acetaldehyde contains paraldehyde as an impurity and the dried mass is subjected to a temperature of from 60°C to 140°C for from 10 to 30 minutes.

7. The method according to claim 5 wherein the acetaldehyde contains paraldehyde as an impurity and the drying step includes a final stage at a temperature of from 60°C to 140°C for a period of from 10 to 30 min.

8. The method according to claim 5 wherein the acetaldehyde is fixed within the crystals at a level of from about 0.05 to 0.2%.

9. The method according to claim 1 wherein the stiff, crumbly mass is broken apart prior to drying.

10. The method according to claim 9 wherein the drying is initiated at a temperature of from about 30°C to 40°C.

11. The method according to claim 9 wherein the drying is initiated within a vacuum oven.

12. The method according to claim 9 wherein the drying is initiated with high-velocity, low-relative-humidity air.

13. The method according to claim 9 wherein the drying is effected by subjecting the crumbly mass to an initially low temperature and progressively increasing the temperature as drying is accomplished, the rate of increase being such that the remaining mother liquor always remains supersaturated.

14. The method according to claim 13 wherein the initial drying temperature is about equal to that of the crumbly mass upon termination of crystallization.

15. The method according to claim 13 wherein the final drying temperature is greater than about 60°C.

* * * * *

UNITED STATES PATENT AND TRADEMARK OFFICE
CERTIFICATE OF CORRECTION

PATENT NO. : 3,898,347
DATED : August 5, 1975
INVENTOR(S) : William A. Mitchell

It is certified that error appears in the above-identified patent and that said Letters Patent are hereby corrected as shown below:

In column 5, line 4, change -- optionally -- to "optimally".

In column 5, line 13, after 140°C., "In a preferred" should be the start of a new paragraph.

Signed and Sealed this

Third Day of August 1976

[SEAL]

Attest:

RUTH C. MASON
Attesting Officer

C. MARSHALL DANN
Commissioner of Patents and Trademarks